(12) United States Patent
Verweg

(10) Patent No.: US 7,668,322 B2
(45) Date of Patent: Feb. 23, 2010

(54) DEVICE FOR DETECTING PRESSURE FLUCTUATIONS, DISPLAY DEVICE, RECORDING DEVICE AND SOUND REPRODUCTION SYSTEM

(75) Inventor: Fransiscus Gerardus Coenradus Verweg, Heerlen (NL)

(73) Assignee: TPO Hong Kong Holding Limited, Hong Kong (HK)

( * ) Notice: Subject to any disclaimer, the term of this patent is extended or adjusted under 35 U.S.C. 154(b) by 1578 days.

(21) Appl. No.: 10/145,642

(22) Filed: May 15, 2002

(65) Prior Publication Data
US 2003/0007656 A1 Jan. 9, 2003

(30) Foreign Application Priority Data
May 18, 2001 (EP) .................................. 01201883

(51) Int. Cl.
H04R 25/00 (2006.01)
(52) U.S. Cl. ...................................................... 381/172
(58) Field of Classification Search .................. 381/11, 381/172, 311
See application file for complete search history.

(56) References Cited

U.S. PATENT DOCUMENTS

| | | | |
|---|---|---|---|
| 3,051,003 A * | 8/1962 | Witt .............................. 73/705 |
| 3,056,297 A * | 10/1962 | Duke ............................. 73/705 |
| 4,142,774 A * | 3/1979 | Wright ........................... 385/4 |
| 4,235,113 A | 11/1980 | Carome .......................... 73/655 |
| 4,294,513 A * | 10/1981 | Nelson et al. ................... 385/4 |
| 4,443,700 A | 4/1984 | Macedo et al. |
| 4,538,140 A * | 8/1985 | Prestel .......................... 340/556 |
| 4,932,263 A | 6/1990 | Wlodarezyk .................... 73/705 |
| 5,119,448 A * | 6/1992 | Schaefer et al. ................. 385/4 |
| 5,333,205 A * | 7/1994 | Bogut et al. ................... 381/172 |
| 6,239,726 B1 * | 5/2001 | Saida ............................ 340/999 |
| 6,462,808 B2 * | 10/2002 | Paritsky et al. ............... 356/4.01 |
| 6,498,853 B2 * | 12/2002 | Paritsky ........................ 381/66 |
| 6,697,137 B2 * | 2/2004 | Nemoto et al. ................ 349/113 |
| 6,738,051 B2 * | 5/2004 | Boyd et al. ..................... 345/176 |
| 6,865,335 B2 * | 3/2005 | Paritsky et al. ................. 385/7 |
| 7,114,395 B2 * | 10/2006 | Miyazawa et al. .............. 73/655 |

FOREIGN PATENT DOCUMENTS

EP 0798650 S2 1/1997
EP 0 798 650 A2 10/1997

OTHER PUBLICATIONS

Office Action dated Nov. 27, 2008 for Korean Patent Application 10-2003-7000606.
Communication pursuant to Article 94(3) EPC from corresponding EP Application No. 02 771 688.5.

* cited by examiner

Primary Examiner—Alexander Jamal
(74) Attorney, Agent, or Firm—Lowe Hauptman Ham & Berner, LLP

(57) ABSTRACT

Part of the (synthetic material) substrate (8) of a display is combined with a light source, e.g. a LED (14) and a photodetector (20) to be used as an optical microphone. A membrane (11) is formed which deforms due to air pressure fluctuations caused by sound waves. The fluctuations are detected by the photodetector for further processing.

9 Claims, 3 Drawing Sheets

Figure 1:
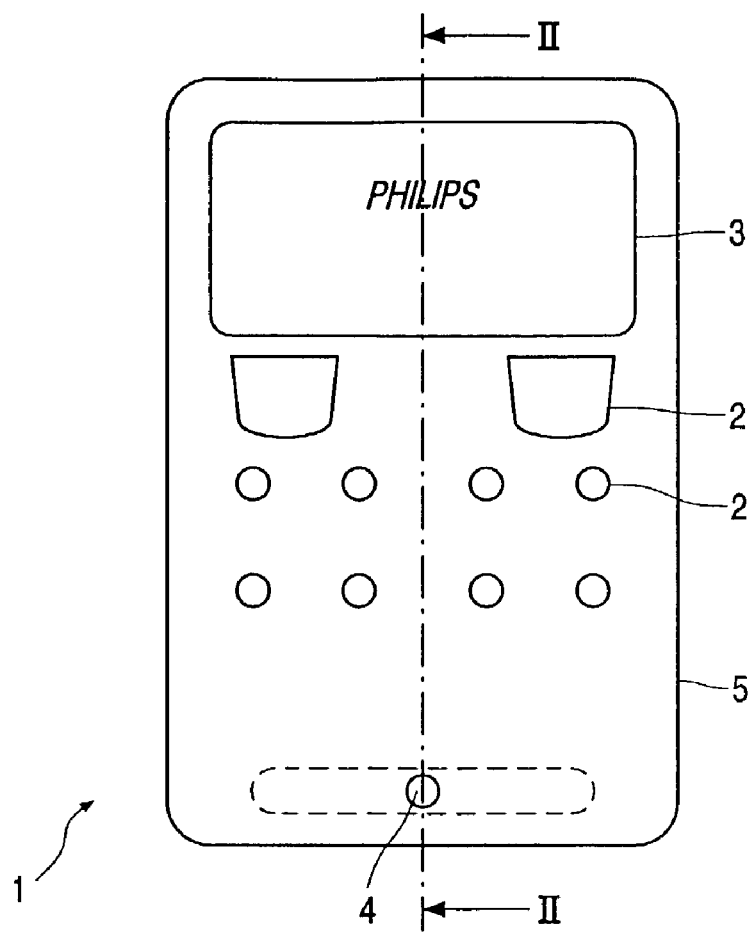

DEVICE FOR DETECTING PRESSURE FLUCTUATIONS, DISPLAY DEVICE, RECORDING DEVICE AND SOUND REPRODUCTION SYSTEM

The invention relates to a device for detecting pressure fluctuations, notably for picking up sound signals (microphone). The invention particularly relates to a microphone for use in a (portable) display device. Such display devices find an increasingly wider application in, for example, mobile telephones. However, the invention may also be used in other display devices such as organizers, laptop computers and the like. Due to the increasing miniaturization, the demand for integration of the display screen with the recording function, but also, for example, with the keyboard is increasing.

It is an object of the invention to solve this problem by means of a method in which integration of said components, or at least parts thereof, is realized as much as possible and, to this end, provides a device for detecting pressure fluctuations, the device comprising an optical waveguide of an optically transparent, deformable material, and a light source along a part of the edge of the optical waveguide, and a photosensitive element. More generally, the optical waveguide comprises a substrate or partial substrate of an optically transparent, deformable material with sides transverse to a first surface, at least one of which has an entrance face for light, while light from a light source can be coupled in on said side, and an exit portion for light in a plane transverse to the first surface.

The invention is based on the recognition that the elastic material is deformed due to pressure fluctuations (for example, sound waves). The deformation is dependent on the pressure fluctuations (sound waves) and, with this deformation, the extent to which the light is coupled out of the optical waveguide also changes. The variation of exiting light is detected by means of the photosensitive element, for example, a photodiode. This photosensitive element (and also the light source) is located, for example, along a further part of the edge of the optical waveguide or within or along a further part of the substrate or partial substrate.

The optical waveguide preferably has a plurality of end faces, at least one of which is an entrance face for light, while light from the light source can be coupled in on this end face of the optical waveguide. The photosensitive element is then advantageously located at the area of a further end face opposite said end face.

Said optical waveguide may form part of a larger assembly, for example, a substrate which is also provided with further operating elements for the relevant apparatus (for example, a mobile telephone). For example, a second optical waveguide functioning as a waveguide for an illumination source (backlight or front light) of, for example, a liquid crystal display device may be arranged at other locations on the substrate.

For optimum functioning as a microphone, the optical waveguide has a thickness of preferably less than 1 mm.

The microphone may of course also be integrated in other apparatus.

These and other aspects of the invention are apparent from and will be elucidated with reference to the embodiments described hereinafter.

IN THE DRAWINGS

Figure 2:
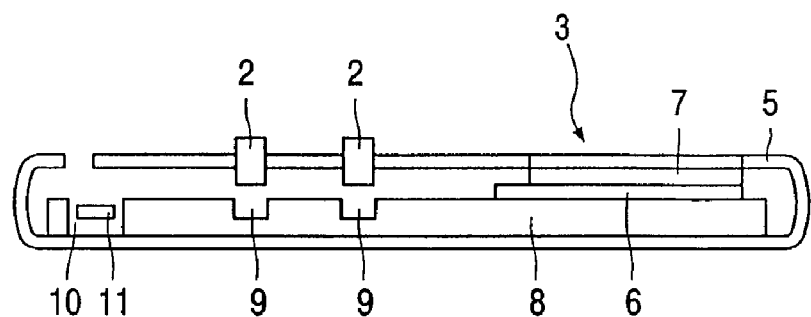
Figure 3:
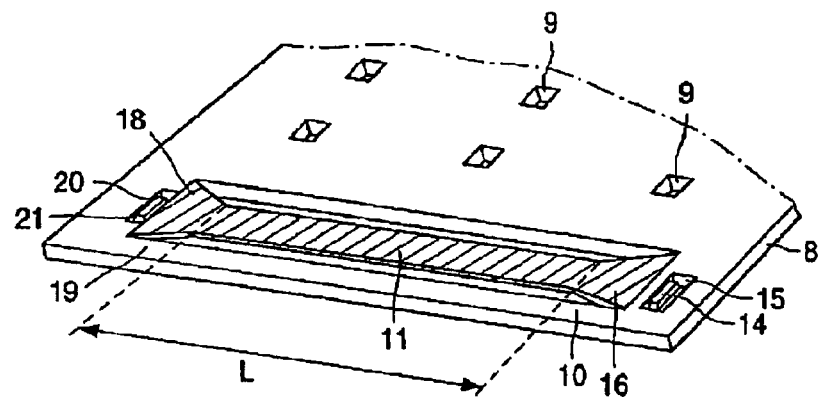
Figure 4:
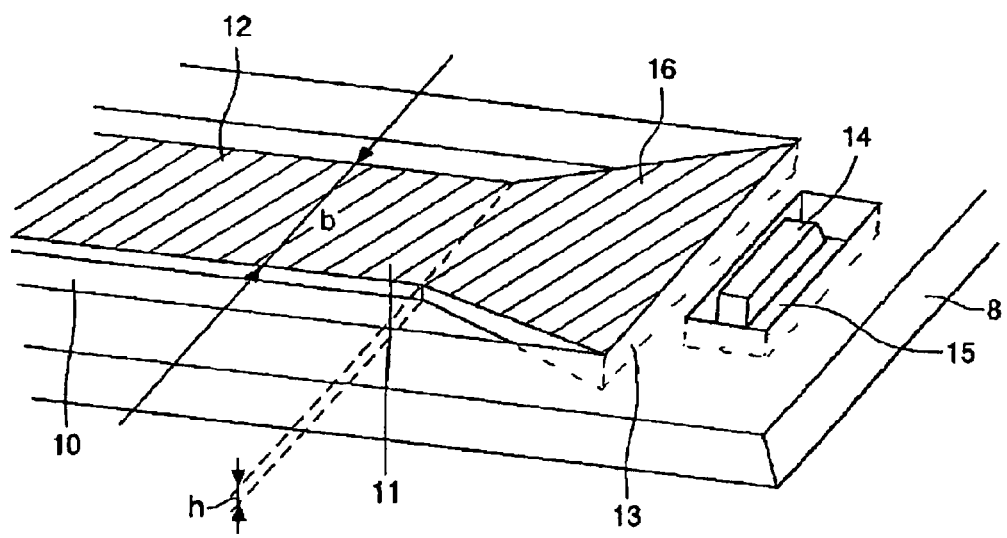
Figure 5:
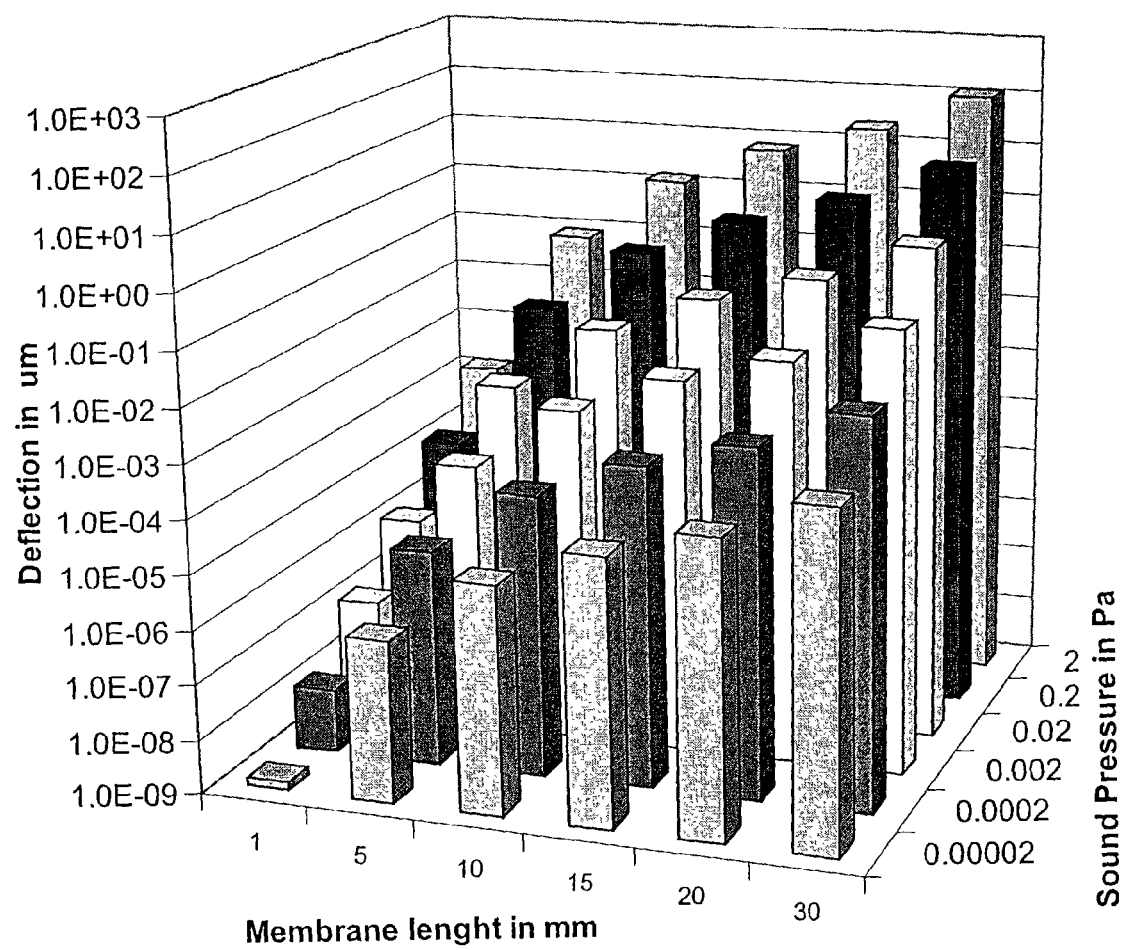

FIG. 1 is a plan view of a mobile phone comprising a microphone according to the invention, FIG. 2 is a cross-section taken on the line II-II in FIG. 1, while FIG. 3 is a plan view of a part of a substrate in which the microphone has been realized, and FIG. 4 shows an enlarged part of FIG. 3, while FIG. 5 shows the deflection of a membrane as a function of its length and the sound pressure.

The drawings are diagrammatic and not drawn to scale. Corresponding components are generally denoted by the same reference numerals.

FIG. 1 shows a device 1 according to the invention, in this case a mobile phone comprising the customary keys 2, a display 3 and a microphone 4 in a housing 5. In this example, the display is a liquid crystal display device with a layer of liquid crystal material (not shown) between two substrates 6, 7 (see FIG. 2). The display 3 may be of the active (AMLCD) or the passive type.

The display 3 is fixed in this example on a transparent support (substrate) 8 having recesses 9 at the area of the keys 2. If desired, means for detecting pressure on the keys are present at the area of the recesses 9.

The substrate 8 (the support) is made of, for example, a synthetic material and has an aperture 10 in which a microphone has been realized. To this end, the aperture 10 (see FIGS. 3, 4) accommodates a first optical waveguide 11, 16, 18 of an optically transparent material having a first surface 12 and an entrance portion for light 13 along a first part of an edge of the optical waveguide in a plane transverse to the first surface. Although light does not immediately need to be generated near this entrance portion 13, this plane (and more generally a plane perpendicular to a main surface through which light enters a part of the optical waveguide) is considered to be the entrance portion in the further description. In this example, the light is generated by a LED 14 in a further recess 15 in the substrate 8. The light may also be generated at other areas and then be guided towards the entrance portion (face) 13 by means of mirrors or other optical elements. In the relevant example, the portion 11 of the optical waveguide has a smaller thickness than a tapered in-coupling part 16 and a tapered out-coupling part 18. The part 11 functions as a membrane for the microphone.

Light from the LED 14 is coupled into the optical waveguide 11 at the area of the face 13 and coupled into the membrane 11 with a thickness h and a length L via the tapered part 16. After passage through the membrane 11, the light is coupled out at the area of the face 19 via the tapered out-coupling part 18. To detect the exiting light, an aperture 21 accommodates a photodiode 20 or another photosensitive element in the present invention. For a satisfactory operation, the thickness h is as small as possible because the excursion is then greater so that the light variations in the membrane 11 are maximal. When used in a mold, it will be about 0.8 mm, but thicknesses of up to 0.2 mm are certainly possible.

When, due to pressure fluctuations (for example, sound waves), the membrane 11 of elastic material is deformed, the extent to which the light within the optical waveguide is reflected also changes with this deformation. The variation of exiting light is detected by means of the photosensitive element, in this example the photodiode 20.

Since the optical waveguides 11, 16, 18 are formed as one assembly, a simpler construction is provided which, moreover, can be obtained in a very efficient manner, for example, by means of molding. Since the membrane has an open structure, it will deform to only a small extent when the sound comes from two opposite directions, and the microphone is less sensitive to ambient sound than existing microphone structures.

The variation of exiting light is detected by means of the photosensitive element, in this example the photodiode 20.

The light may also be detected at other locations after it has been guided from the face 19 to a suitable location by means of mirrors or other optical elements. If the display device is formed with amorphous (or polycrystalline) TFT transistors in a matrix configuration, the matrix can be extended by extra TFT transistors which are specially arranged for detection and, if necessary, optimized for this purpose. This notably applies when the substrate 6 is omitted and the substrate 8 is also used as an LCD substrate.

For detection of the variation generated by variation of exiting light in the photocurrent of the photodiode, there are various possibilities such as amplification by means of a suitable amplifier. The LED 14 may emit light pulse-wise at a frequency which strongly deviates from the frequency of the (sound) waves to be recorded so that detection is possible through frequency separation.

FIG. 5 shows the extent of deflection of a membrane as a function of its length and the sound pressure at a membrane thickness of 0.8 mm. The indicated values for the sound pressure (0.00002 Pa, 0.0002 pA, . . . , 0.2 pA, 2 pA) correspond to silence, whispering, normal conversation, street noise, a symphony orchestra and aircraft noise, respectively.

The invention is of course not limited to the examples described hereinbefore. For example, light sources other than LEDs may be used. Instead of a liquid crystal display device, other display devices may be used alternatively such as those that are based on electrophoresis, electroluminescence, P(O) LEDs and, for example, mechanical mirrors. Moreover, the device for detecting pressure fluctuations (microphone) is also applicable in completely different fields, for example, in dictation apparatus or other recording apparatus in which such a recording device has, for example, a memory function (for example, as tape recording apparatus, semiconductor memories or a recording function for writable ROMs). More generally, the microphone is applicable in a sound reproduction system comprising at least an amplifier and a loudspeaker.

The protective scope of the invention is not limited to the embodiments described hereinbefore.

The invention resides in each and every novel characteristic feature and each and every combination of characteristic features. Reference numerals in the claims do not limit their protective scope. Use of the verb "comprise" and its conjugations does not exclude the presence of elements other than those stated in the claims. Use of the article "a" or "an" preceding an element does not exclude the presence of a plurality of such elements.

The invention claimed is:

1. A device, comprising:
    a substrate comprising an aperture;
    a light source;
    an optically transparent, deformable membrane accommodated in the aperture and configured to deform in response to pressure fluctuations on a surface of the deformable membrane, the deformable membrane comprising:
        longitudinally opposite first and second ends,
        a middle portion connecting the first and second ends, wherein the middle portion is narrower than the first and second ends,
        an entrance face that is adjacent to the first end and transverse to the surface for receiving light from the light source, and
        an exit face that is adjacent to the second end and transverse to the surface for outputting light that is received at and transmitted from the entrance face; and
    a photosensitive element that is configured to convert the light from the exit face into electrical signals indicative of the pressure fluctuations.

2. The device of claim 1, wherein the light source is optically coupled to the entrance face by at least one optical element.

3. The device of claim 1, wherein the photosensitive element is optically coupled to the exit face by at least one optical element.

4. The device of claim 1, wherein the optically transparent deformable membrane forms an optical waveguide having a plurality of end faces, one of which includes the entrance face and is optically coupled to the light source.

5. The device of claim 4, wherein the photosensitive element is optically coupled to the exit face which is opposite the entrance face.

6. The device of claim 5, wherein the optical waveguide has a thickness of at most 1 mm.

7. The device of claim 5, wherein the optical waveguide has a thickness of at most 0.2 mm.

8. The device of claim 1, wherein the photosensitive element includes a semiconductor element.

9. The device of claim 1, further comprising a sound reproduction system that includes at least an amplifier and a loudspeaker.

* * * * *